United States Patent [19]

Mazur et al.

[11] 4,125,831
[45] Nov. 14, 1978

[54] SELF-CONTAINED DATA ACQUISITION DEVICE

[75] Inventors: Richard A. Mazur, Downers Grove; Ralph E. Martin, Oak Lawn, both of Ill.

[73] Assignee: Continental Can Company, Inc., New York, N.Y.

[21] Appl. No.: 775,842

[22] Filed: Mar. 9, 1977

Related U.S. Application Data

[63] Continuation of Ser. No. 470,173, May 15, 1974, abandoned.

[51] Int. Cl.² .......................................... H03K 13/02
[52] U.S. Cl. ......................... 340/347 AD; 73/362 R; 73/362 AR; 340/347 DA; 340/347 M
[58] Field of Search .......... 340/347 M, 347 R, 347 C, 340/347 AD, 347 DA, 347 NT; 73/362 AR, 362 R, 341, 343.5; 235/92 MT

[56] References Cited

U.S. PATENT DOCUMENTS 3,880,007  4/1975  Emschermann et al. ...... 73/362 AR

Primary Examiner—Thomas J. Sloyan
Attorney, Agent, or Firm—Diller, Brown, Ramik & Wight

[57] ABSTRACT

A self-contained data acquisition device or probe capable of monitoring any physical function that can be translated into an analog or digital signal. The data acquisition probe is coupled to a separate translator whereat the stored analog or digital voltage signals are transferred to the translator to be coupled to a display device for displaying the voltage signals.

6 Claims, 3 Drawing Figures

SELF-CONTAINED DATA ACQUISITION DEVICE

This is a continuation, of application Ser. No. 470,173 filed May 15, 1974, now abandoned.

BACKGROUND OF THE INVENTION

This invention relates, in general, to a system for acquiring data at one location, retaining the acquired data in a storage memory, transferring the stored data upon demand to a translator removed from the point of data acquisition, and displaying the translated data through a recirculatable display as desired.

More specifically, this invention relates to a self-contained data acquisition device capable of receiving and storing analog or digital voltage signals representative of any physical function that may be expressed in terms of voltage variations. The data acquisition device is coupled to a translator upon obtaining the desired data and the information stored therein is transferred upon demand to the translator whereat the information is retained for display on an external display device such as an oscilloscope or electro-mechanical recorder. The information transferred to the translator is stored therein so that the information may be displayed in repetitive cycles as desired.

In many applications it is desirable to sample or monitor various physical functions which can be expressed in terms of varying voltage signals, either analog or digital. Certain of these applications require that such measurements or samples be made remotely due to hostile environment, such as high temperatures, vibrations, radiation, or noxious fumes. In other applications it is difficult to maintain a continuous link between the data acquisition or sampling device and the read out or display system due to the inaccessibility of placing the units in contact with the data to be monitored. Examples of such applications would be monitoring data from pasteurizers, retorts, rotating shaft equipment, or furnaces and ovens.

In certain applications such as wherein it is desired to measure the temperature of a can passing through an oven, such as is frequently encountered in a conventional can line oven, a thermocouple is attached to a can by means of leads having a length sufficient to allow the can to pass through the entire oven while the other ends of the leads are connected to a standard thermo-couple recorder to receive and display the temperature the can is subjected to while passing inside the oven. While such a system is somewhat satisfactory for use with conventional can line ovens, such a method of temperature monitoring is impractical for use in monitoring the temperatures of cans passing through a pin or brush oven.

A pin or brush oven is utilized in the process of fabricating can bodies to dry open-topped cans after they have been treated by sprays or passed through liquid baths. The oven comprises a plurality of short pins, rods or brushes secured at one end to a link chain conveyor which passes about a plurality of sprockets in multi-loop vertical paths through the oven. Open-ended cans are suspended from the free end of the pin or brush to be passed through the oven.

In monitoring the temperature of a can passing through a pin or brush oven, the method employed by a conventional can line oven is impractical because of the multi-loop can paths. Therefore, one proposed solution to this problem has been through the use of telemetering equipment using a transmitter and receiver. However, such a system is very expensive in that an antenna must be intalled in the oven and shaped to conform to the multi-loop path.

The present invention utilizes a self-contained battery-operated data acquiring device which is supported from the pin transport or conveyor adjacent to and electrically coupled with a can having a thermocouple attached thereto. At predetermined time intervals the data probe monitors the voltage output from the thermocouple and stores this temperature information in its internal history. After the data probe emerges from the oven, it is connected to a translator whereat the information is transferred from the data acquisition device or probe into the translator. The translator converts the information into a display signal for display on standard recorders. Since the chain or transport velocity is known, a plot of temperature versus time can be converted into one of temperature versus position within the oven.

SUMMARY OF THE INVENTION

It is, therefore, an object of this invention to improve monitoring or data sampling systems.

Another object of this invention is to improve data acquisition or sampling devices by eliminating the necessity of an external power source.

A further object of this invention is to acquire data samples in a storage memory to be displayed or otherwise utilized at a position removed from the source of acquiring the data samples.

Still another object of this invention is to acquire data samples and transfer the acquired data to a display system whereat the information may be displayed repetitively.

A still further object of this invention is to initiate the acquisition of data and automatically terminate data acquisition upon reaching the capacity of the memory unit.

Yet another object of this invention is automatically to transfer the acquired data to a translator system upon demand which automatically recycles the acquired data to provide a sequential display thereof upon command.

These and other objects are attained in accordance with the present invention wherein there is provided a self-contained data acquisition device or probe capable of monitoring any physical function that can be translated into an analog or digital signal. The data acquisition probe is coupled to a separate translator whereat the stored analog or digital voltage signals are transferred to the translator to be coupled to a display device for displaying the voltage signals.

DESCRIPTION OF THE DRAWINGS

Further objects of the invention, together with features contributing thereto and advantages accruing therefrom, will be apparent from the following description of one embodiment of the invention when read in conjunction with the accompanying drawings wherein:

FIG. 3 is an electrical schematic of the translator utilized to receive the information from the data probe for converting this information to signals which may be coupled to a display apparatus.

DESCRIPTION OF A PREFERRED EMBODIMENT

Figure 1:
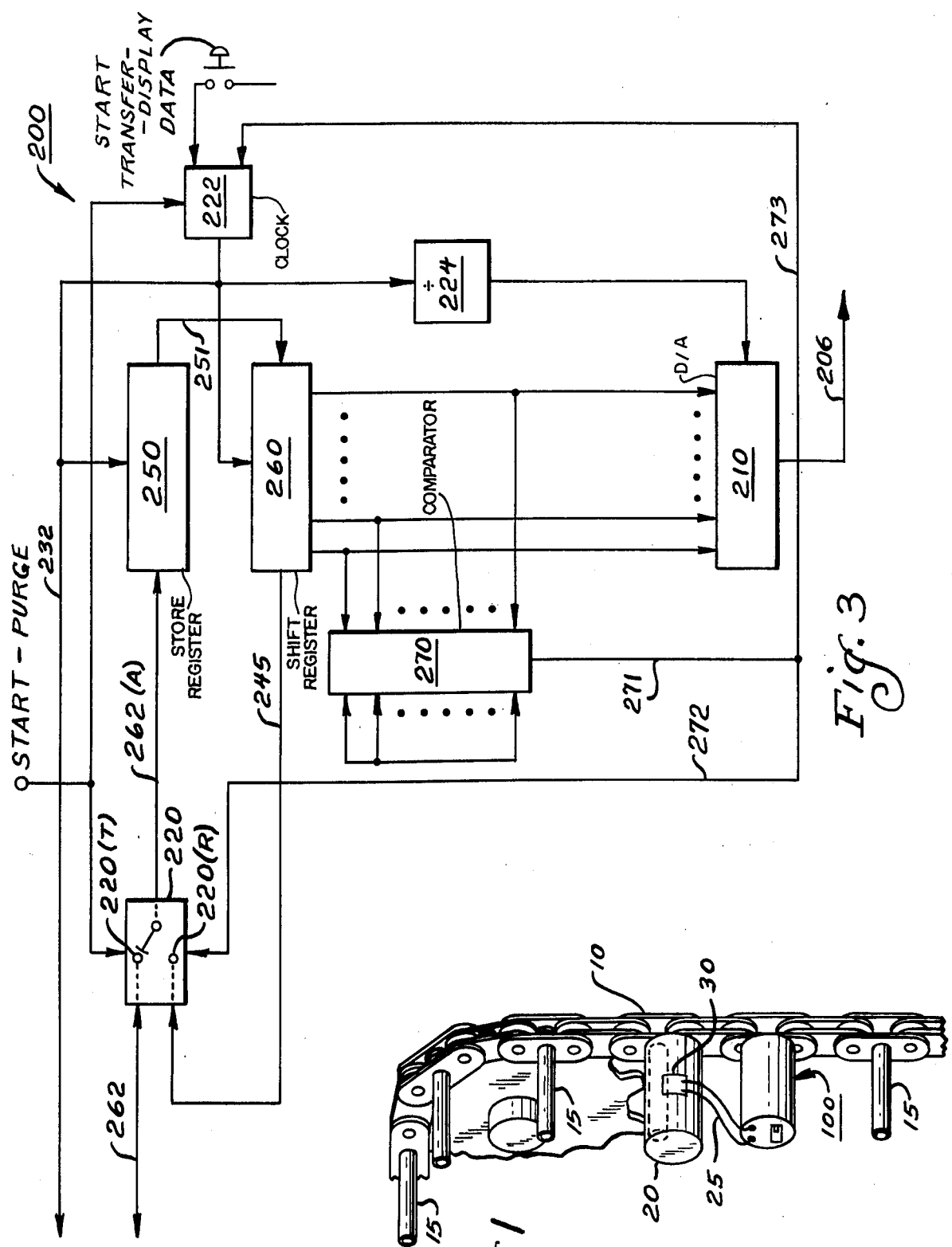
FIG. 1 is a mechanical schematic of the data probe being utilized in a pin oven.

Referring now to FIG. 1, there is shown the data acquisition device or probe 100 supported from a sprocket driven chain or conveyor means 10 which is utilized to convey can bodies through a pin oven. The data probe 100 has one end thereof formed with a threaded stud for engaging the internal thread of the chain conveyor 10 which is normally utilized to secure a pin or rod 15 to the chain. A plurality of pins or rods 15 are secured to the chain 10 by external threads on one end of the pin threadingly engaged with internal threads on the chain carrier such that the pins or rods 15 are secured thereto with one end free. Can bodies 20 are placed on the free end of the pin and in this manner conveyed through the pin oven. As shown in FIG. 1, one of the pins or rods 15 is removed from the chain 10, and the data probe 100 is threadingly engaged with the chain 10 such that it will pass through the pin oven in the same manner as the adjacent cans. Leads 25 are connected from the data probe to an adjacent can body 20 to which a suitable thermocouple 30 has been appropriately secured. In this manner, as the can 20 passes through the pin over the variations in temperature occurring in the oven will effect a physical change in the thermocouple 30 which will impose a variable analog voltage signal upon the data probe 100.

Figure 2:
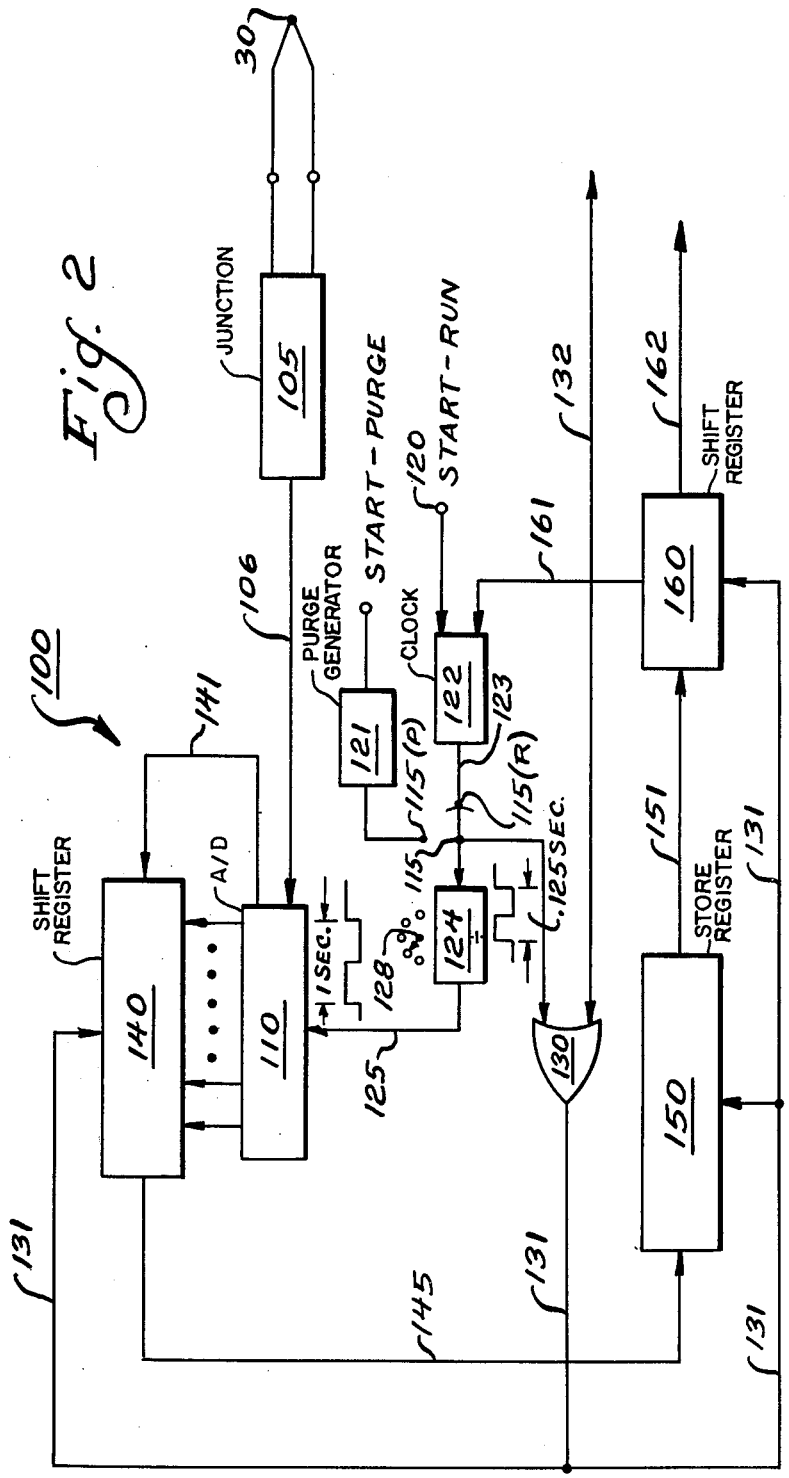
FIG. 2 is an electrical schematic of the data acquisition device or probe to illustrate the manner in which voltage signals are coupled to the probe and stored in the device for subsequent transfer to the translator.

Referring now to FIG. 2, there is shown an electrical schematic of the data acquisition device or probe 100. The thermocouple 30 may be of any commercially available type, such as a type "J" iron-constantan. The input from the thermocouple 30 is coupled to a reference junction 105. Therefore, the varying voltage output from the reference junction, at line 106, which is coupled to an analog to digital converter 110 is due to the variation in the ambient temperature to which the thermocouple is subjected and is unaffected by the various internal temperature variables. The reference junction is preferably a Model No. JR366 available from Consolidated Ohmic Devices.

Acquisition of data (storage of the voltage input from line 106) by the data acquisition device or probe 100 is initiated by actuation of the START-RUN switch 120. While the data acquisition probe operates in a data acquiring mode (wherein the probe 100 is accepting data from thermocouple 30), a transfer mode (wherein the data in the storage memory of the probe 100 is transferred to the translator 200), and a purge mode (wherein all of the information in the probe is removed to insure that it is ready to accept new data) for convenience of illustration, it will be assumed that the system has been purged of all data and the probe 100 is ready to accept information from the thermocouple or any other suitable analog or digital voltage source.

DATA ACQUISITION MODE

Upon actuation of the START-RUN switch 120, an eight Hertz, or eight cycles per second, generator 122 is actuated providing an output signal having a frequency of eight Hertz. This output signal is coupled by line 123 through a two position switch 115 to a suitable frequency divider 124 which divides the input frequency by eight providing a square wave output having a cycle of 1 second on the line 125. The one cycle per second output on the line 125 from the frequency divider 124 is utilized by the analog to digital converter 110 to initiate the conversion of the analog voltage signal provided from the thermocouple 30 through the line 106 to a digital representation.

The output from the frequency generator 122 is also coupled as one input to an "OR" gate 130 providing an eight cycle per second or eight Hertz input thereto. The output signal from the "OR" gate 130 provided on the line 131 is coupled to the clock line of the three registers, the shift register 140, the store register 150 and the shift register 160. The clock wave form applied to the three registers on the line 131 is utilized to clock or synchronize the transfer of information out of the shift register 140 into the store register 150 and out of the store register 150 into the shift register 160. Shift register 140 and the store register 150 are preferably RCA Models CD4021 and CD 4031, respectively, which are CMOS type integrated circuits.

Actuation of the switch 115 to the run position 115(R) from the purge position 115(P) effects entry into the analog to digital converter 110 of a predetermined digital code, referred to as a pilot word, comprising a unique combination of 8 bits of information that will not occur in the digital conversion of any normal analog voltage coupled to the converter 110 from the thermocouple 30. This pilot word is utilized to perform certain functions in the operation of the system. While various digital inputs could be utilized, this pilot word has been determined to correspond to all eight outputs from the analog to digital converter 110 being logic "0" except on the second least significant bit which will be a logic "1" or high.

After the pilot word has been loaded in parallel from the analog to digital converter 110 into the shift register 140 (to be described hereinafter), the process of sampling an analog voltage representing a temperature sensed by a thermocouple 30 is effected once per second starting the conversion on the positive transition of the wave form applied to the analog to digital converter 110 from line 125. The analog voltage signal will be converted into an eight bit byte or word which will be transferred to the parallel-in, serial-out shift register 140 upon the end of conversion which is effected by the converter 110 generating an end of conversion pulse to the shift register 140 upon the completion of the eight bit conversion. The end of conversion pulse is applied through the lead line 141 to the shift register 140. The application of the load pulse on the line 141 will cause the shift register 140 to receive the eight bit parallel input from the converter 110. As soon as the eight bit byte is loaded into the shift register 140, the clock wave pulse provided on the line 131 and coupled to the shift register 140, as well as to the store register 150 and to the shift register 160, will cause the eight bit parallel input byte to be serially transferred through the line 145 as an input to the store register 150. The 8 Hertz pulses provided through the "OR" gate 130 to the clock line 131 are utilized serially to transfer the eight bits of information from the shift register 140 into the store register 150 during the time period in which the next eight bit byte is being formed from the analog voltage input on the line 106 in the analog to digital converter 110.

This sequence of information acquisition continues until the store register 150 has reached its capacity for containing eight bit bytes at which time its capacity is reached, entry of the next eight bit byte of informational data will cause the pilot word to be transferred from the storage register 150 to the shift register 160. When the initial eight bit byte of information referred to as the pilot word has been shifted from the store register 150 into the shift register 160, the output line 161 becomes high thereby turning off generator 122 terminating the command signals which enable the analog to digital converter 110 and prevent any more of the analog voltage signals 106 from being entered into the system.

STAND-BY MODE

In this state of operation, the memory or store register 150 of the probe 100 has been loaded to its capacity with signals corresponding to the number of temperature samples the probe has stored while passing through the pin oven. The pilot word has been transferred into the shift register 160 turning off the generator 122 preventing further information from entering the analog to digital converter 110 and, therefore, the shift register 140. The data probe 100 is now in a stand-by condition and may be removed from the conveying chain 10 for coupling to the translator 200 whereat the information contained in the probe is transferred thereto and signals generated by the translator which may be coupled to any appropriate display device for displaying the data input. Since the probe can no longer receive any information the analog voltage signals from the thermocouple 30 are stored in the probe and the probe may be maintained in the stand-by condition until the time when the information stored therein is removed. In this manner, the probe may be transferred to any remote location whereat the data contained therein is removed for display.

DATA TRANSFER MODE

A translator 200 which is utilized to remove the information from the data probe 100 and convert the data into signals for display purposes is illustrated in the electrical schematic of FIG. 3. The translator includes an internal clock generator 222 to drive the clock line 131 (FIG. 2) for transferring the data from the shift register 140, the store register 150, and the shift register 160 into the translator at the rate determined by the translator clock generator 222. For convenience of illustration, it is assumed that upon initial operation the translator 200 has been purged of all information and is ready to accept the data from the probe 100.

To transfer the information from the data probe 100 into the translator 200, input-output line 132 connected to the "OR" gate 130 of the data probe is coupled to the clock line 232 of the translator. The output line 162 from the serial-in, serial-out shift register 160 is coupled to the input line 262 of the translator. The two position data selector switch 220 is manually actuated into its transfer position 220(T) coupling the input line 262 through line 262 (A) to storage register 250. Since upon termination of operation of the data probe 100 the shift register 160 has the pilot word stored therein, the first output from the shift register 160 couples the pilot word into the store register 250 as its first input. Store register 250 is preferably the same as the store register 150 of the data probe 100.

With the data selector switch 220 being in the input or transfer position 220(T) the clock generator 222 is actuated through the TRANSFER/DISPLAY DATA start switch providing an output signal of eight Hertz or cycles per second on the clock line 232. The clock line 232 which is coupled to the line 132 (FIG. 2) of the data probe generates clocking pulses to the registers 140, 150, and 160 of the data probe transferring all of the information from the probe into the storage register 250.

Upon the last eight bit byte of information being transferred from the data probe into the translator, the pilot word will be shifted from storage register 250 to shift register 260, since the capacity of storage register 250 is the same as that of storage register 150 of the data probe, and the pilot word will be coupled through line 251 to the serial-in, parallel-out, shift register 260. Shift register 260 is preferably an RCA Model CD 4015 CMOS integrated circuit. Upon the appearance of the pilot word at the output of the shift register 260, this signal will be sensed by a magnitude comparator 270 generating a high or logic "1" output which is coupled through the line 271 as an input through the line 272 to the data selector switch 220. Magnitude comparator 270 is prewired with a reference signal to generate a high output signal on the line 271 upon the appearance of the pilot word being presented at the output of the shit register 260. The high signal from the magnitude comparator will cause the selector switch 220 to be moved from the data transfer position 220(T) to the recirculate position 220(R) locking the data in the translator memory, store register 250. This indicates that all of the data has been removed from the probe and has been entered into the store register 250 of the translator 200. The movement of the data selector switch from the transfer position 220(T) to the recirculate position 220(R) prevents entry of any additional data into the translator. In addition, the high output signal from the magnitude comparator 270 is coupled by line 273 to the generator 222 whereat the high or logic "1" output signal turns off the generator. Therefore, the data probe 100 can be uncoupled from the translator for further use. Lines 132 and 162 of the data probe are disconnected the from lines 232 and 262 of the translator thereby freeing each unit from the other.

DATA DISPLAY MODE

After the output of the magnitude comparator 270 has become high moving the data selector switch 220 into the recirculate mode and terminating the output from the frequency generator 222, the information from the data probe 100 has all been transferred into the memory or storage register 250 of the translator 200. The translator is now ready to display the information through the eight bit parallel-in, serial-out, digital to analog converter 210.

In order to display the information stored in the store register 250, the manual TRANSFER/DISPLAY DATA start switch is again actuated for generator 222 providing an output signal to the store register 250 and the shift register 260 to transfer the 8 bit bytes of information from the store register to the shift register for coupling to the digital to analog converter 210. The output from the generator 222 is also coupled through a frequency divider 224 as a input to the digital to analog converter 210 providing a control signal to display this information upon the entry of the 8 bits of digital information which are converted to an analog signal on line 206 representing the analog input signals from the thermocouple 30 appearing on line 106. In addition, the eight bit bytes that are transferred from store register 250 into the shift register 260 are clocked out of the shift register on line 245 through the recirculate path 220(R) of the data selector switch 220 back through line 262(A) into the storage register 250. Upon the completion of a complete display cycle wherein all of the information transferred from the data probe into the storage register 250 has been serially passed therefrom through shift register 260, the pilot word will again be passed through store register 250 into shift register 260. When the pilot word, which initially stopped the input to the translator 200 by terminating the transfer clock pulses generated by the generator 222 when the data probe 100 and the translator 200 were connected together, again enters the shift register 260, the appearance of the pilot word will again be sensed by the magnitude comparator 270 generating another high signal on the line 271 which will be coupled to the generator 222 by the line 273 terminating the operation thereof. Since the data selector switch 220 has previously been in the recirculate mode 220(R) the high output from the magnitude comparator 271 which will be imposed on the data selector switch 220 through the line 272 will have no effect on the data selector switch since it is already in the recirculate position. If it is desired again to display the data, the start TRANSFER/DISPLAY DATA button of the generator 222 is again actuated and the entire display sequence repeated.

When the data is no longer needed, the system is purged to insure that all data has been removed from the probe 100 as well as the translator 200.

PURGE MODE

To purge the data probe 100 of all information, the switch 115 is moved to the purge position 115(P) couplng the generator 121 into the data probe circuitry. The start PURGE button of the generator 121 is actuated to load logic "0" into both the shift registers 140 and 160 as well as the store register 150. After the registers have been, the purged by having logic "0" loaded into the registers switch 115 is shifted to the run position 115(R) to accept data input to the registers as commanded when the switch 115 is moved to the run position 115(R), the placing of the switch in this mode loads the 8 bit pilot word or control byte into the analog to the digital converter 110.

The translator 200 is purged in a similar manner by serially loading logic "0" into the storage register 250 and the shift register 260. After the logic "0" has been loaded into the registers the, switch 220 is moved to the data transfer position 220(T). Since the first eight bit byte of information loaded into the translator when coupled to the data probe is the pilot word, it is not necessary to artificially load the pilot word into the translator to control operation. The pilot word will be automatically entered as the first eight bit byte of information transferred from the shift register 160 to the storage register 250.

Since thr transfer of the information from the data probe 100 to the translator 200 is controlled solely by the frequency of the generator 222 the transfer may proceed at any desired rate. Therefore, it is preferred that the frequency of the generator 222 be greater than that of the generator 122 of the data probe for faster transfer of data.

In addition, while the frequency divider 124 illustrated divides the generator 122 output by eight, the data probe 100 is provided with a selector switch 128 such that the pulse frequency may be divided by preselected multiples if it is desired to increase or decrease the sampling rate.

While the invention has been disclosed with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An information translating system for receiving digital voltage signals from an external source, translating the signals into analog form for coupling to a display device and retaining the signals for repetitive display comprising
    switch means actuable to couple a source of digital voltage signals representing information to be translated into analog form for a display device,
    memory means having a predetermined capacity to store digital signals coupled to said switch means to retain digital signals upon actuation thereof, and to pass said digital signals upon coupling of control pulses thereto,
    register means coupled to said memory means to receive digital signals therefrom and having a first output coupling said digital signals to converting means for transforming said signals to analog form, and a second output passing said signals to said switch means,
    converting means coupled to said register means to receive digital signals therefrom and transform said signals into analog form,
    comparator means coupled to said register means for generating a command signal upon a predetermined pattern of digital signals being coupled from said register means to said converting means,
    said command signal being coupled to said switch means to inhibit coupling the source of digital voltage signals thereto and to establish a coupling of the serial output of said second register means to said memory means, and
    said command signal actuable to inhibit the coupling of control pulses to said memory means thereby terminating the digital signals passed thereby to said register means for coupling to said digital to analog converting means.
2. The apparatus of claim 1 wherein said converting means coupled to said register means comprises a digital to analog converter.
3. The apparatus of claim 1 further including a frequency generator coupled to said memory means and said register means to provide clock pulses synchronizing the passing and receiving of said signals.
4. The apparatus of claim 3 further including a frequency divider coupled between the output of said frequency generator and said converting means to provide control signals thereto of a frequency defined as a multiple of the clock pulse frequency coupled to said memory means and said register means.
5. The apparatus of claim 3 wherein said command signal generated by said comparator means upon a predetermined pattern of digital signals being coupled from said register means to said converting means terminates operation of said frequency generator.
6. A data acquisition and translating system for monitorng variable voltage signals, translating the signals into analog form for coupling to a display device and retaining the signals for repetitive display comprising converting means for receiving variable voltage signals from a source thereof and generating digital output signals representative of said variable voltage, first register means actuable upon receipt of a control signal for receiving said digital output signals and passing said signals to first memory means having a predetermined storage capacity for retaining said digital signals, said first memory means passing a predetermined pattern of digital signals upon exceeding the storage capacity thereof, synchronizing means for providing control signals to synchronize and control the receipt of said digital output signals by said register means and the passing thereof to said memory means, inhibit means coupled to said memory means for receiving said predetermined pattern of digital signals passed therefrom upon exceeding the storage capacity thereof to generate a command signal terminating the operation of said synchronizing means inhibiting the passing of digital output signals to said memory means, and the receipt of digital output signals by said register means, switch means actuable to couple said digital output voltage signals to a second memory means having a capacity to store digital signals equal to said first memory means capacity to retain said digital output signals upon actuation thereof, and to pass said digital output signals upon coupling of control pulses thereto, second register means coupled to said second memory means to receive said digital signals therefrom and having a first output coupling said digital signals to converting means for transforming said signals to analog form, and a second output passing said signals to said switch means, converting means coupled to said second register means to receive digital signals therefrom and transform said signals into analog form, comparator means coupled to said second register means for generating a command signal upon said predetermined pattern of digital signals being coupled from said second register means to said converting means, said command signal being coupled to said switch means to inhibit coupling said digital voltage signals to said second memory means and to establish a coupling of the serial output of said second register means to said memory means, and said command signal actuable to inhibit the coupling of control pulses to said second memory means thereby terminating the digital signals passed thereby to said second register means for coupling to said digital to analog converting means.

* * * * *